US 9,155,138 B2

(12) United States Patent
Snelten

(10) Patent No.: US 9,155,138 B2
(45) Date of Patent: Oct. 6, 2015

(54) DRIVER FOR COOPERATING WITH A WALL DIMMER

(75) Inventor: Jeroen Snelten, Liempde (NL)

(73) Assignee: KONINKLIJKE PHILIPS N.V., Eidhoven (NL)

( * ) Notice: Subject to any disclaimer, the term of this patent is extended or adjusted under 35 U.S.C. 154(b) by 673 days.

(21) Appl. No.: 13/380,587

(22) PCT Filed: Jun. 22, 2010

(86) PCT No.: PCT/IB2010/052811
§ 371 (c)(1),
(2), (4) Date: Dec. 23, 2011

(87) PCT Pub. No.: WO2010/150183
PCT Pub. Date: Dec. 29, 2010

(65) Prior Publication Data
US 2012/0098516 A1    Apr. 26, 2012

(30) Foreign Application Priority Data
Jun. 25, 2009  (EP) ...................... 09163721

(51) Int. Cl.
*H05B 33/08*  (2006.01)
*H05B 41/392*  (2006.01)

(52) U.S. Cl.
CPC ........ *H05B 33/0815* (2013.01); *H05B 41/3924* (2013.01); *Y02B 20/347* (2013.01); *Y10T 307/50* (2015.04)

(58) Field of Classification Search
CPC .................................................. H05B 33/0815
USPC .................................................. 315/291, 224
See application file for complete search history.

(56) References Cited

U.S. PATENT DOCUMENTS

| 3,667,030 | A | * | 5/1972 | Gordon et al. | ................. 323/319 |
| 4,350,935 | A | * | 9/1982 | Spira et al. | .................... 315/291 |
| 5,574,319 | A | * | 11/1996 | Bennett | ......................... 307/114 |
| 6,043,611 | A | | 3/2000 | Gradzki et al. | |

(Continued)

FOREIGN PATENT DOCUMENTS

| GB | 2435724 A | 9/2007 |
| JP | 2006319172 A | 11/2006 |

(Continued)

OTHER PUBLICATIONS

"Known measures to keep leading edge dimmer from oscillation", Application Note AN2711, pp. 1-31, figures 26 and 27, Mar. 2008.

*Primary Examiner* — Douglas W Owens
*Assistant Examiner* — Pedro C Fernandez
(74) *Attorney, Agent, or Firm* — Yuliya Mathis

(57) ABSTRACT

A current correction circuit (200) has an input (201) and includes: a first controllable current source (220) having an input connected to the circuit input for drawing a first current (I 220) from the circuit input; a differentiator (210) having an input coupled to the circuit input and having an output coupled to the first current source; and/or a second controllable current source (240) having an input connected to the circuit input for drawing a second current (I 240) from the circuit input; a voltage comparator (230) having a first input coupled to the circuit input (201), having a second input coupled to receive a reference signal (Vref), and having an output coupled to the second current source. The circuit is responsive to voltage changes by drawing first current pulses (221) from the circuit input, and/or to low voltages by drawing second current pulses (241) from the circuit input.

18 Claims, 9 Drawing Sheets

(56) References Cited

U.S. PATENT DOCUMENTS

| | | |
|---|---|---|
| 7,304,439 B2 * | 12/2007 | Tang et al. ............... 315/291 |
| 7,511,437 B2 * | 3/2009 | Lys et al. ............... 315/307 |
| 2003/0080696 A1 | 5/2003 | Tang et al. |
| 2007/0285028 A1 | 12/2007 | Tsinker et al. |
| 2008/0130336 A1 * | 6/2008 | Taguchi ............... 363/125 |
| 2008/0224629 A1 | 9/2008 | Melanson |
| 2008/0258647 A1 * | 10/2008 | Scianna ............... 315/291 |

FOREIGN PATENT DOCUMENTS

| | | |
|---|---|---|
| JP | 2009140631 A | 6/2009 |
| WO | 9706654 A1 | 2/1997 |
| WO | 2005115058 A1 | 12/2005 |
| WO | 2006006085 A1 | 1/2006 |
| WO | 2008029108 A1 | 3/2008 |
| WO | 2009121956 A1 | 10/2009 |
| WO | 2009131956 A1 | 10/2009 |

\* cited by examiner

Conventional Driver

Conventional Driver

DRIVER FOR COOPERATING WITH A WALL DIMMER

FIELD OF THE INVENTION

The present invention relates in particular to a driver for driving light sources, especially LEDs, but the driver of the invention can be applied for driving any type of load.

BACKGROUND OF THE INVENTION

As will be commonly known to persons skilled in the art, electronic drivers have been developed for driving light sources such as gas discharge lamps, LEDs, OLEDs, etc. Such driver is powered from mains, and provides an output current for the light source. The driver may be designed for controlling the current magnitude, but may also be designed for controlling the output power. The driver may have a user control input, typically wirelessly coupled to a remote control, via which a user may control the light intensity, i.e. dim the light source. In such case, dimming is performed by the driver, by reducing the output current intensity (amplitude) or reducing the PWM duty cycle of the lamp current.

There are, however, also situations where the driver does not receive normal mains, i.e. a sine-shaped voltage of for instance 230 V 50 Hz in Europe, but receives a dimmed input voltage. Such situation may typically occur when replacing an existing light source by a light source with integrated electronic driver, when the existing light source is for instance an incandescent lamp powered via a wall-mounted dimmer. Such dimmers typically operate on the basis of phase-cutting the mains voltage, using a TRIAC. Since such dimmers are commonly known, the following description will be kept brief.

FIG. 1A is a graph schematically showing voltage (vertical axis) versus time (horizontal axis) of rectified mains. In can be seen that this voltage follows a continuous sine-shaped curve, of which the negative portions are inverted. The power provided to a resistive load, expressed as $P=U^2/R$, can be considered as being proportional to the surface area under the curve.

FIGS. 1B and 1C are comparable graphs showing the output voltage of phase-cutting dimmers, i.e. a leading edge dimmer (FIG. 1B) or a trailing edge dimmer (FIG. 1C). In the case of a leading edge dimmer (FIG. 1B), the output voltage is suppressed to remain zero immediately after a zero-crossing of the mains, until a certain phase $p_X$ between 0 and 180° when the voltage makes a jump to follow the mains curve. Again, the power provided to a resistive load can be considered as being proportional to the surface area under the curve: it can be seen that this power is reduced when said phase $p_X$ is increased (righthand side of the curve). In the case of a trailing edge dimmer (FIG. 1C), the voltage follows the mains after a zero-crossing until a certain phase $p_Y$ between 0 and 180° when the voltage is suppressed to make a jump to zero. Again, the power provided to a resistive load can be considered as being proportional to the surface area under the curve: it can be seen that this power is reduced when said phase $p_Y$ is decreased (lefthand side of the curve). The situation of FIG. 1B is indicated as "leading edge dimming" and the situation of FIG. 1C is indicated as "trailing edge dimming".

SUMMARY OF THE INVENTION

FIG. 2 is a block diagram of a practical situation where an electronic lamp driver 20 is connected to "dimmed mains" provided by a mains dimmer 10 operating according to the above-described phase-cutting principle. The dimmer 10 has an input 11 receiving the original mains, and an output 12 providing dimmed mains $V_D$. The dimmer 10 has a user input 13 for controlling the dim level, typically a rotating knob. In a common situation, the dimmer 10 is wall-mounted while a lamp L supplied by the dimmer 10 is mounted relatively remote, illustrated by the long supply lines 14. The lamp L is provided with an electronic driver 20, either as a separate device or as a built-in device, having an input 21 connected to the supply lines 14 to receive the dimmed mains $V_D$, and having an output 22 connected to the actual light source of the lamp L.

A problem in such circuit relates to the fact that the dimmer 10 comprises an inductor and that the driver 20 comprises filtering circuitry including capacitances, which combination may in the case of a leading edge dimmer lead to resonances in the dimmer output current. Another aspect of the problem relates to the fact that the dimmer 10 comprises an output stage with a TRIAC 15. As should be known to a person skilled in the art, a TRIAC switches off when the current drops below a certain level indicated as hold current; this level may depend on the individual TRIAC. Consequently, the output current of the dimmer 10 is switched off before the voltage crosses zero. Further, a TRIAC needs a certain ignition current, also indicated as latching current, to switch on. As a result of the resonances mentioned above, the TRIAC current may drop below the hold current so that the TRIAC switches off. After switch off, the dimmer circuit will cause the voltage to increase so that the TRIAC reignites. This repeated ignition is indicated as "refiring", may have a frequency typically in the range of about 25 Hz-600 Hz, and may lead to noticeable flicker and audible humming, especially when the dimmer 10 is set to a very low dim level.

An object of the present invention is to overcome or at least reduce the above problems.

Particularly, the present invention aims to provide a driver that is adapted to assure maintaining the timing of the current output as provided by the dimmer without the need to adapt the dimmer.

According to an important aspect of the present invention, the driver is provided with active current sink means for increasing the current drawn from the driver at times close to the margins of the TRIAC's conductive periods.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 3A:
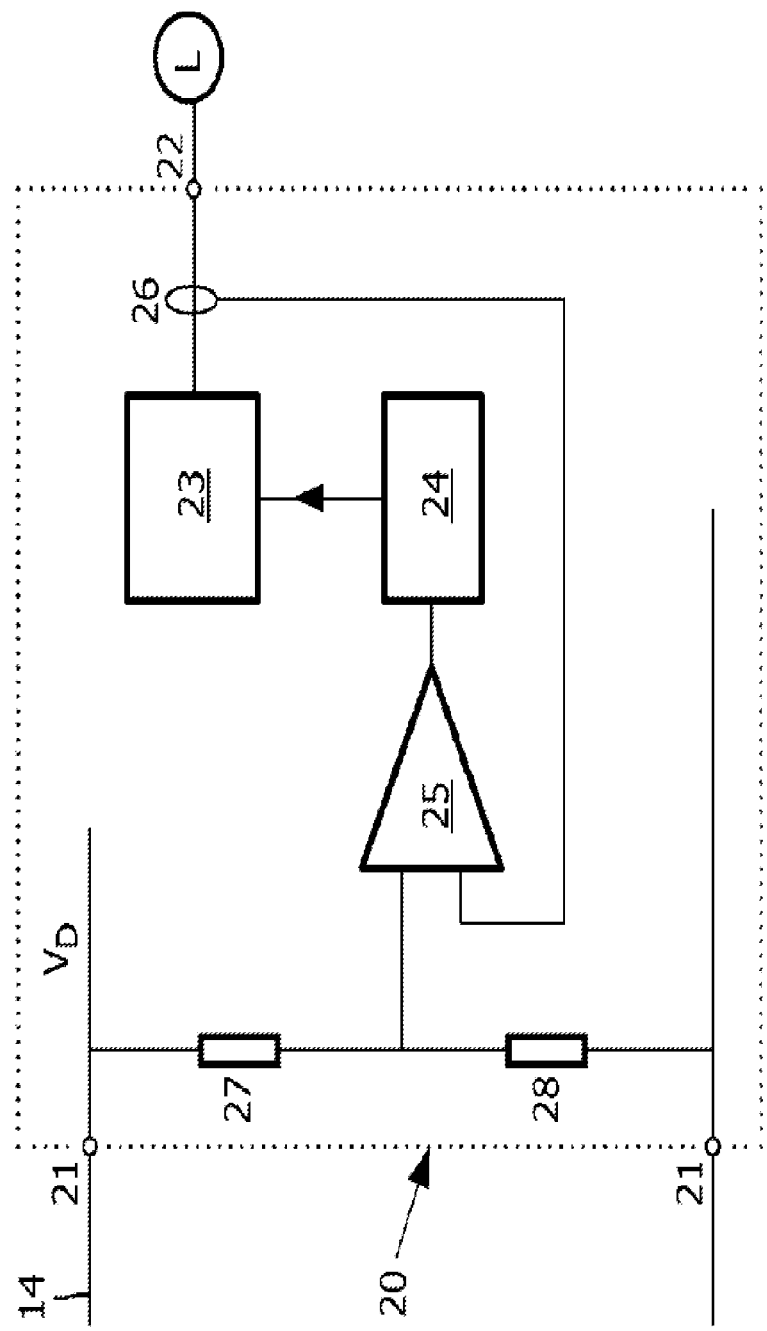
FIGS. 3A and 3B are block diagrams schematically illustrating possible conventional implementations of a lamp driver.
Figure 3B:
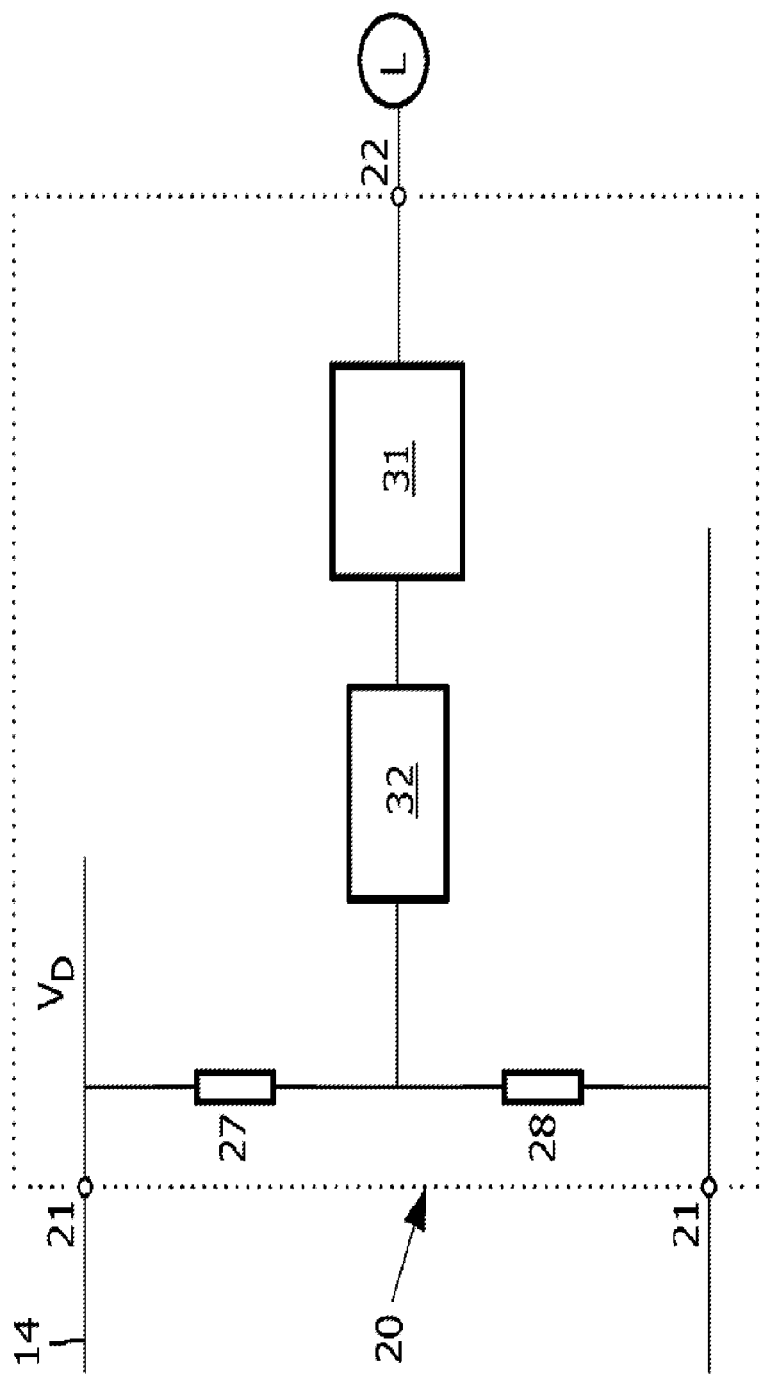

FIGS. 3A and 3B schematically show two ways of implementation of a conventional driver 20. In the embodiment of FIG. 3A, the driver 20 comprises a current generator 23 controlled by a controller 24, a comparator 25 and a current sensor 26. A series arrangement of two resistors 27, 28 provides a signal to one input of the comparator 25, reflecting the momentanous value of the dimmed mains voltage $V_D$. At its other input, the comparator 25 receives a signal from the current sensor 26, reflecting the output current provided to the lamp L. The controller 24 receives an output signal from the comparator 25. Such design assures that the average output current to the load follows the dimmed mains voltage, i.e. the momentary value of the output current is constant but the time during which this current is present will vary corresponding to the energy delivered to the load.

In the embodiment of FIG. 3B, the driver 20 comprises a current generator 31 controlled by a controller 32. The current generator 31 provides pulse width modulated current, i.e. the current is either 100% or 0% of a nominal value, and the duty cycle determines the average current. The controller 32 receives the signal from the two resistors 27, 28, and is capable of calculating the cutting phase and thus calculating the required dimming level. On the basis of this calculated dimming level, the controller sets the duty cycle for the output current.

Figure 4:
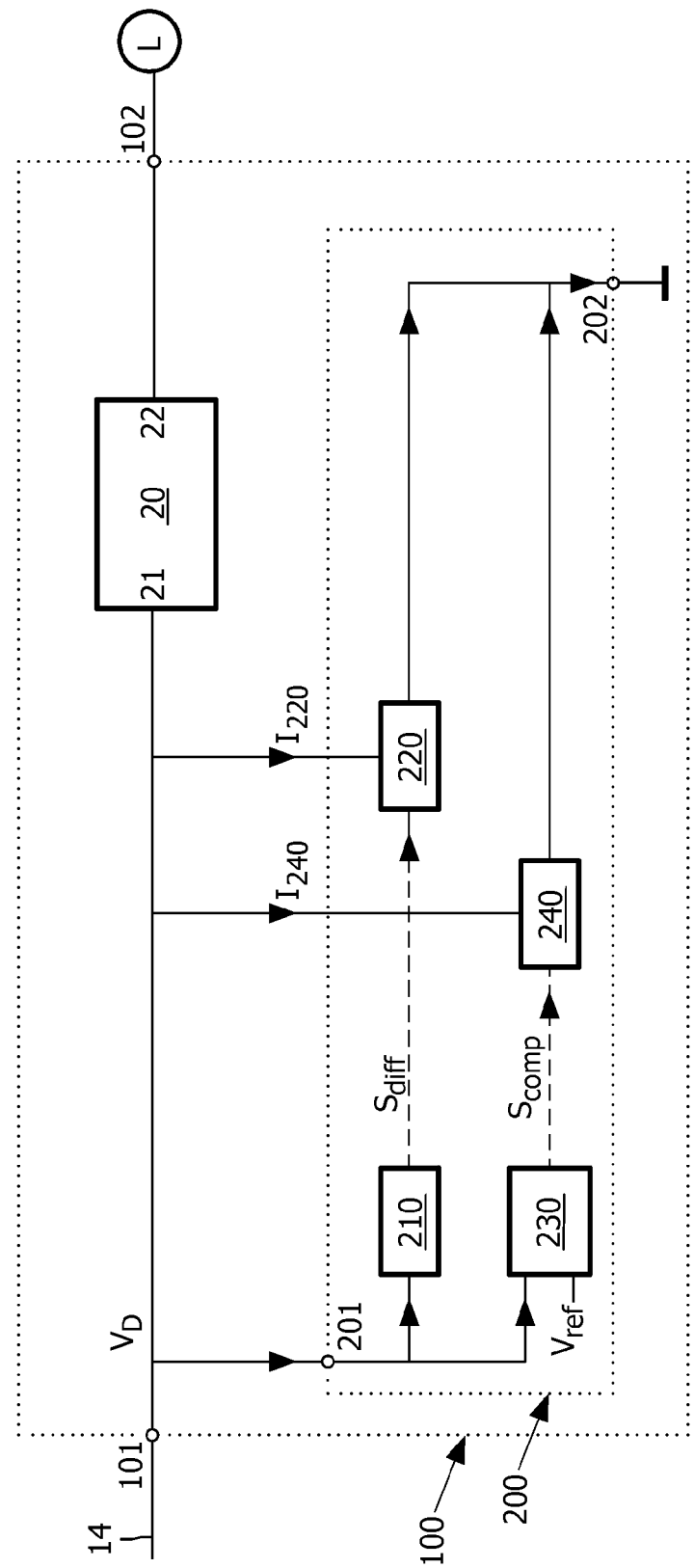
FIG. 4 is a block diagram schematically illustrating a driver assembly according to the present invention.

FIG. 4 is a block diagram schematically illustrating a driver assembly 100 according to the present invention, comprising an input 101 for connection to the supply line 14 and an output 102 for connection to the lamp L. The driver assembly 100 includes a driver 20 having its input 21 connected to the assembly input 101 and having its output 22 connected to the assembly output 102. This driver 20 may be implemented as a conventional driver, as explained above with respect to FIGS. 3A and 3B, or may have any other design, adapted to provide an output current. It is noted that the output current provided by this driver 20 may have the problems mentioned above.

The driver assembly 100 according to the present invention further comprises a current correction circuit 200, having an input 201 and an output 202. Input 201 of the current correction circuit 200 is connected to the assembly input 101. Output 202 of the current correction circuit 200 may be connected to ground, as shown, but may also be connected to the assembly output 102.

It is noted that the current drawn from the dimmer 10 is the summation of the currents drawn by the driver 20, the first current source 220 and the second current source 240.

In one embodiment, the current correction circuit 200 comprises a differentiator 210 having its input coupled to the input 201 of the current correction circuit 200, and a first current source 220 having its output coupled to the output 202 of the current correction circuit 200 and receiving a trigger input signal from the differentiator 210. The differentiator 210 and the first current source 220 may be integrated as one component. In another embodiment, the current correction circuit 200 comprises a voltage comparator 230 having an input coupled to the input 201 of the current correction circuit 200, and a second current source 240 having its output coupled to the output 202 of the current correction circuit 200 and receiving a trigger input signal from the voltage comparator 230. The voltage comparator 230 and the second current source 240 may be integrated as one component. In the preferred embodiment shown, the current correction circuit 200 comprises both the differentiator 210 and the first current source 220 of the first embodiment and the voltage comparator 230 and the second current source 240 of the second embodiment; it is noted that in this case the two current sources 220 and 240 can be integrated.

Figure 5:
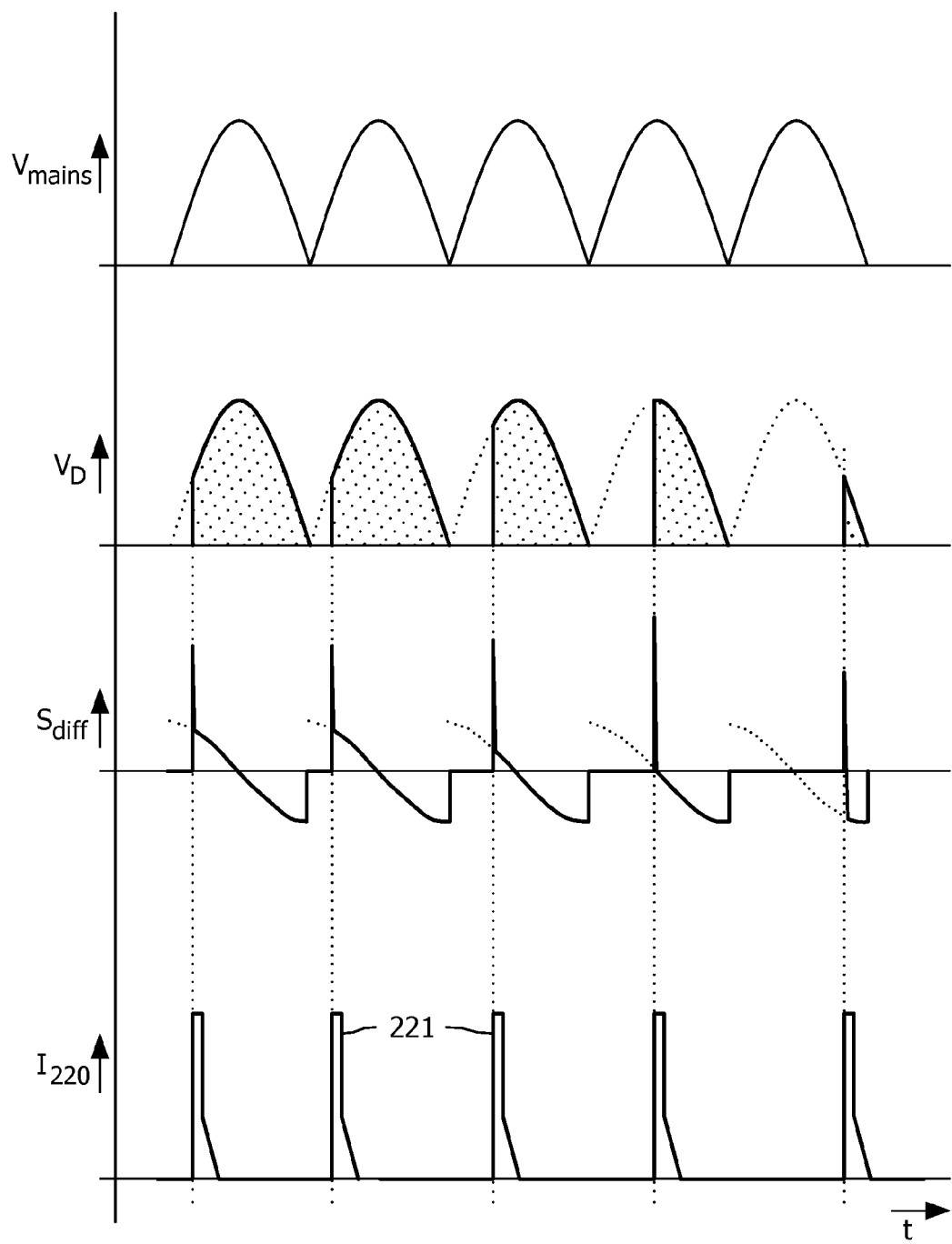
FIGS. 5 and 6 are graphs showing wave forms of voltage and current in an embodiment of the driver assembly according to the present invention.

The differentiator 210 provides an output signal $S_{diff}$ that is proportional to the first derivative of the dimmed mains voltage $V_D$, which is relatively low as long as the dimmed mains voltage $V_D$ follows the sine-wave shaped mains voltage, and which is relatively high on the leading edge of the dimmed mains voltage $V_D$, as shown in the graph of FIG. 5. The first current source 220 has a trigger threshold set such that it is responsive to the high differentiator output pulse associated with the leading edge, and is designed to generate a brief current pulse 221, of which the duration may for instance be determined by a monostable multivibrator. This current pulse 221 may have a duration, magnitude and shape that can be set by the circuit designer in conformity with any design considerations: it is an advantage of the present invention that such parameter design freedom is offered to the designer. FIG. 5 shows a possible shape, corresponding to a small square wave pulse of constant magnitude followed by a gradual, sloping decay in order to prevent exciting again the second order system of inductance and capacitance. It is noted that it should be clear for a person skilled in the art how to implement such current source, so that a more detailed explanation is not needed here.

An advantage of this approach is that the current drawn from the dimmer 10 immediately after the leading edge is mainly determined by the first current source 220 and hardly contains any oscillations any more. Thus, this approach provides for a very efficient oscillation attenuation, and the function of the dimmer is not (or at least less) disturbed by such oscillations, so that no refiring or flicker occurs. It is further noted that the brief duration of the current pulse will result in only little or no influence on EMI behavior. A further advantage is that the current drawn from the dimmer 10 immediately after the leading edge is sufficiently high such as to maintain the TRIAC conducting, so that specific latching circuitry is not needed any more, although such circuitry if present would not harm.

Figure 6:
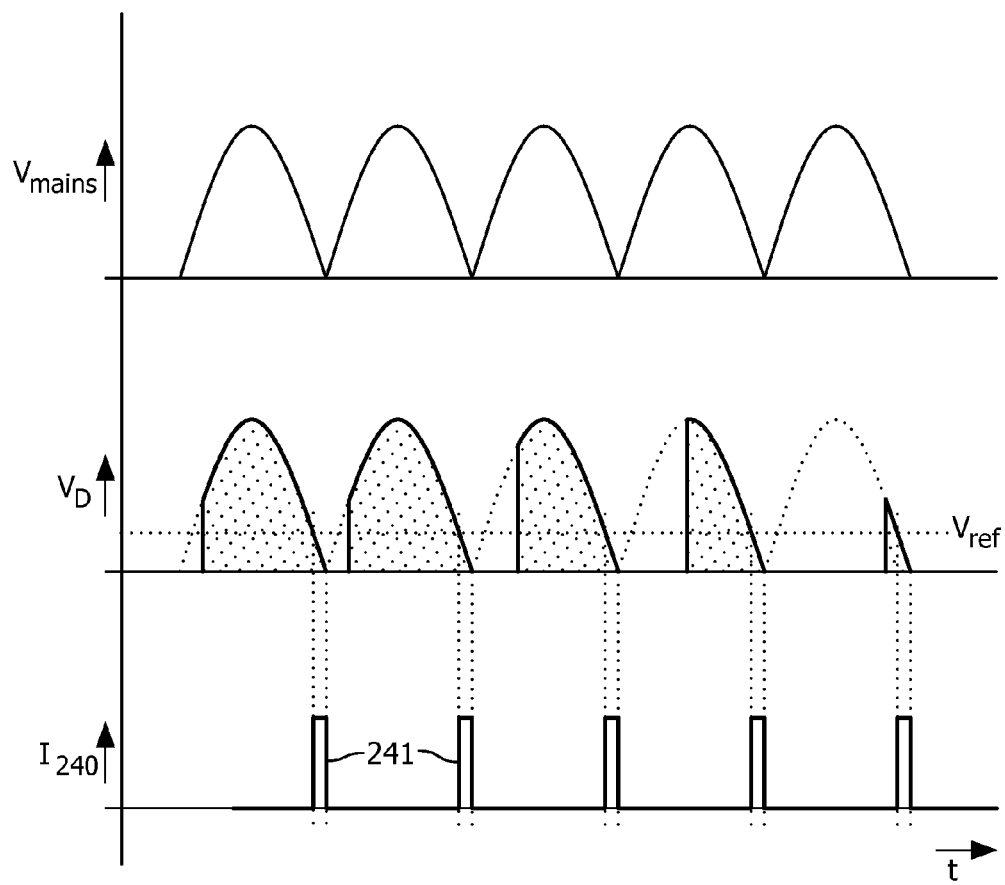

The voltage comparator 230 compares the dimmed mains voltage $V_D$ with a predetermined reference level Vref reflecting the holding current of the TRIAC. As long as the dimmed mains voltage $V_D$ is higher than the reference level Vref, the output signal Vcomp of the voltage comparator 230 has a first value (for instance LOW) to keep the second current generator OFF. When the dimmed mains voltage $V_D$ drops below the reference level Vref, the output signal Vcomp of the voltage comparator 230 switches to a second value (for instance HIGH), as shown in the graph of FIG. 6, to switch on the second current generator. The second current source 240 thus generates a brief current pulse 241. Again, this current pulse 241 may have a duration, magnitude and shape that can be set by the circuit designer in conformity with any design considerations, which is an advantage of the present invention, but in practice it will be sufficient if the current magnitude of pulse 241 is higher than the holding current and if the pulse is continued for as long as the dimmed mains voltage $V_D$ is lower than said reference level Vref, although it is preferred that the current is switched off when the dimmed mains voltage $V_D$ reaches zero. Nevertheless, it may be advantageous to continue pulse 241 in order to prevent disturbances at the trigger input.

It is noted that it should be clear for a person skilled in the art how to implement such current source, so that a more detailed explanation is not needed here.

An advantage of this approach is that the current drawn from the dimmer 10 immediately before a zero-crossing is mainly determined by the second current source 240. It is noted that the dimmer output current will drop to zero anyway when the dimmed mains voltage $V_D$ crosses zero. It is also possible that the voltage comparator 230 is designed to detect the zero-crossing of the dimmed mains voltage $V_D$ and to switch its output signal Vcomp back to the first value to switch off the second current source 240. This approach allows for a very deep dimming.

Several variations are possible. Instead of a differentiator 210, it is possible to use another signal edge detector circuit. For instance, if it is desirable to use a component that is less sensitive to voltage spikes of the mains, it is possible to use two voltage level detectors responsive to different voltage levels, for instance 10 V and 80 V, and to generate a trigger pulse only if both detectors detect the corresponding voltage level.

Further, it is possible that the first current source 220 receives a signal indicating the momentaneous value of the mains voltage, so that it is possible that the magnitude of the current pulse 221 is made proportional to the momentaneous value of the mains voltage. It is also possible that the magnitude of the current pulse 221 is made proportional to the magnitude of the differentiator 210 output signal $S_{diff}$.

Further, it is possible that the second current source 240 receives a signal indicating the average output load current. In cases of deep dimming (righthand sides of FIGS. 5 and 6), it may be that the current drawn from the dimmer 10 (and thus from the TRIAC) is lower so that the TRIAC might switch off too early. To prevent this, the second current source 240 may increase the current pulse magnitude in response to a signal indicating a low output load current.

If the mains voltage is heavily "polluted" with noise, voltage spikes may trigger the first current source 220 by triggering the edge detector, i.e. differentiator 210. To avoid this, it is possible that the first current source 220 is disabled automatically after having generated its current pulse 221, and that the first current source 220 receives an enable signal either from the comparator 230 or from the second current source 240. It should be clear to a person skilled in the art that the first current source 220 is after all not expected to fire again before the second current source 240 fires.

Figure 1A:
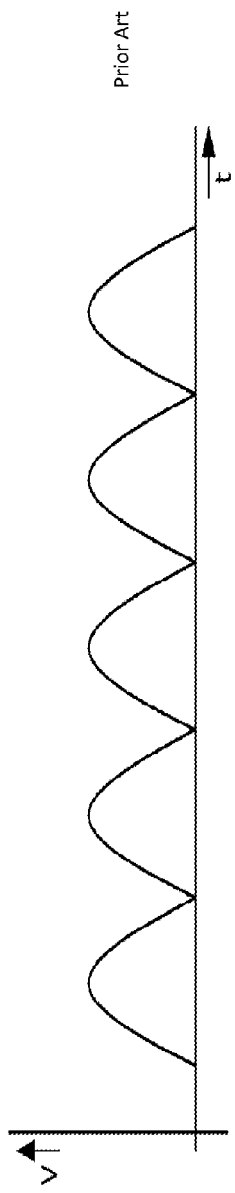
FIGS. 1A-1C are graphs schematically showing voltage versus time.
Figure 1B:
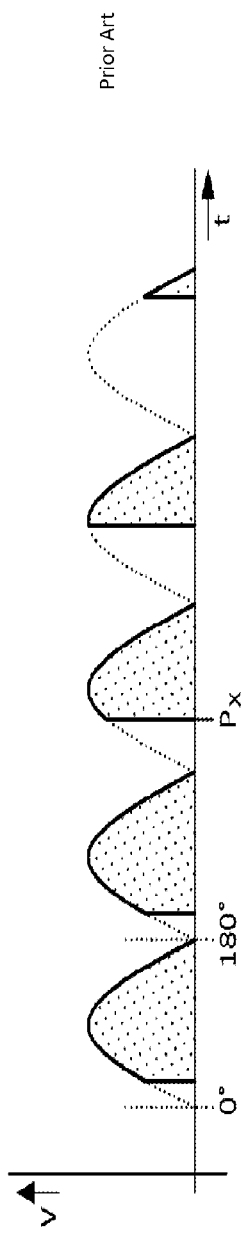
Figure 1C:
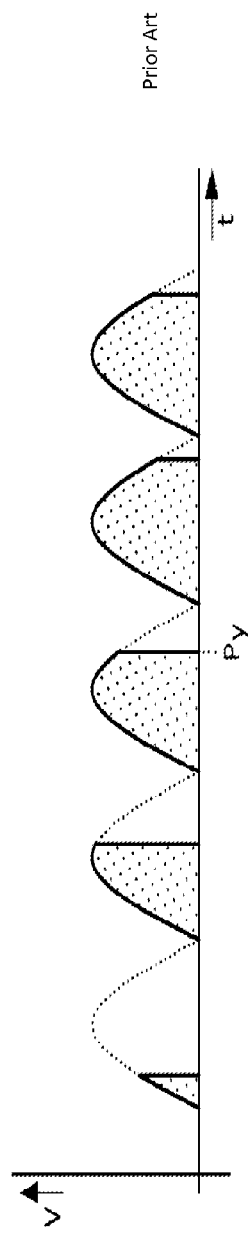

In the case of a trailing edge dimmer (see FIG. 1C), there may be a practical problem in cases when a large capacitor is connected in parallel to the switch in the dimmer, typically a FET, or in parallel to the input in the driver. When the switch is switched off, the voltage to the load should be switched to zero immediately, but the large capacitor still provides a relatively large voltage to the load which, in case of deep dimming and hence relatively low output current, reduces only slowly. For such cases, the first current source 220 is effective to discharge said capacitor relatively quickly. It is noted that the trailing edge is less steep than the leading edge, so that the edge detector/differentiator should be designed to detect the not-so-steep trailing edge and/or the maximum that is achieved before the trailing edge voltage actually starts to decrease.

Figure 8:
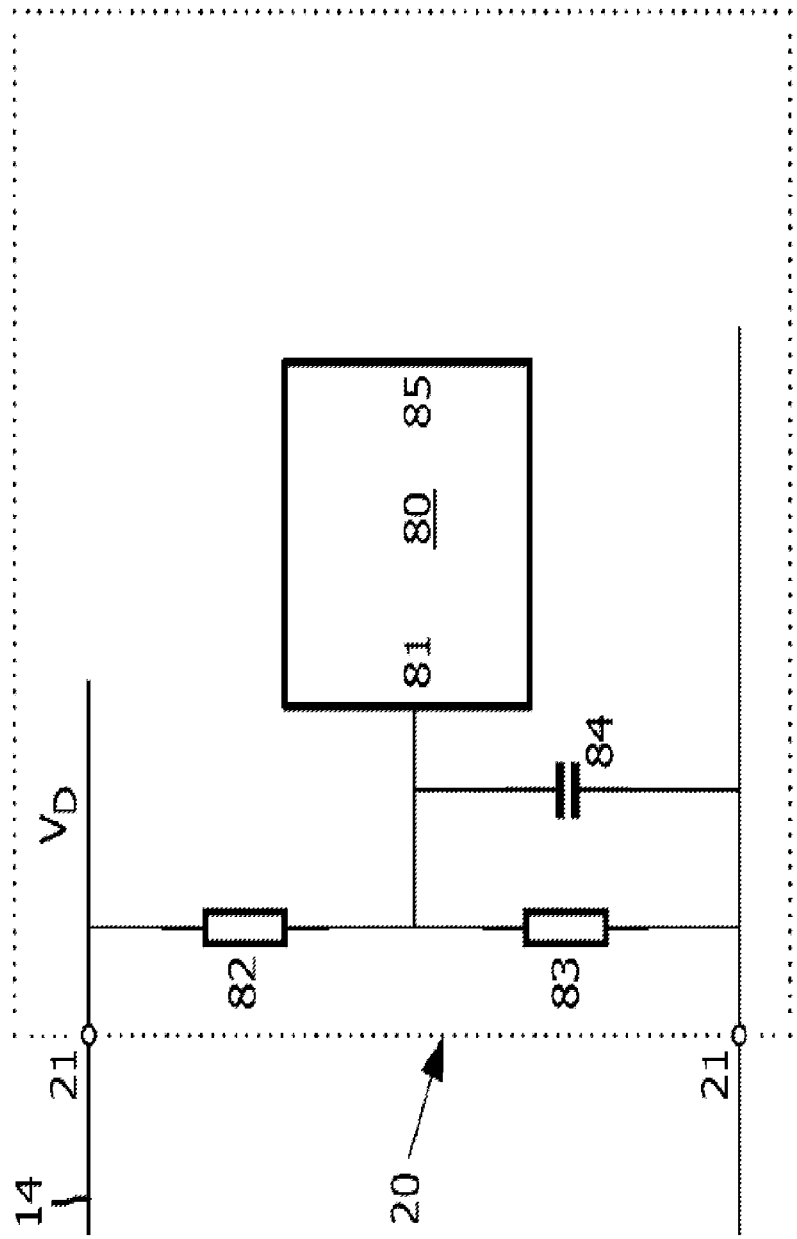
FIG. 8 is a block diagrams illustrating an input stage of a prior art dimmer with a power factor corrector.
Figure 9:
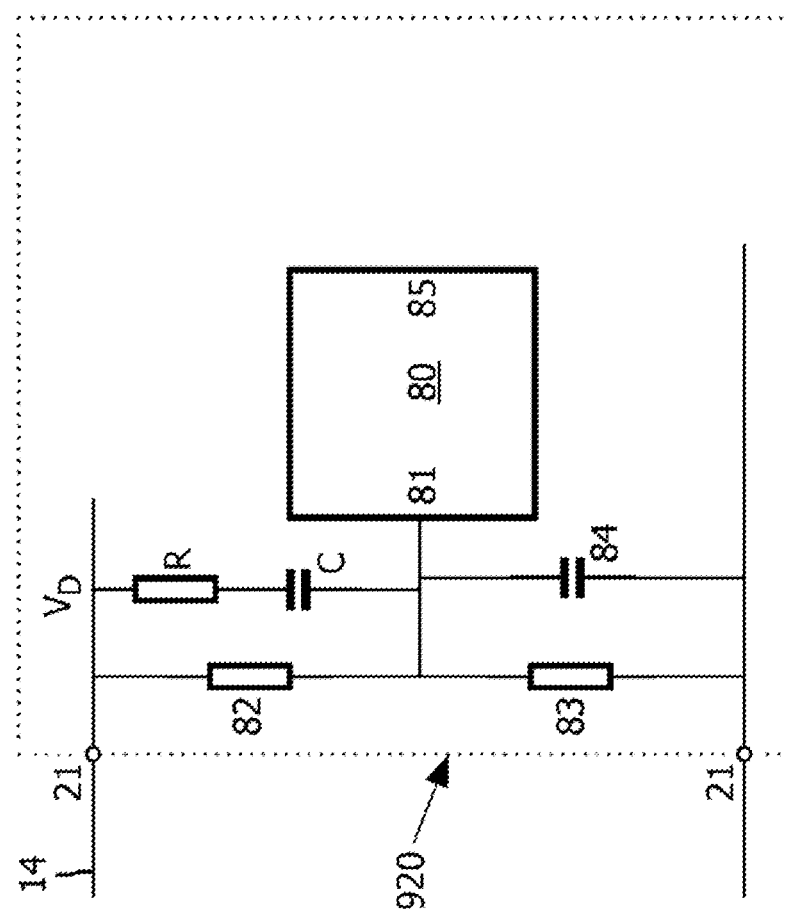
FIG. 9 is a block diagram comparable to FIG. 8, showing an improvement proposed by the present invention.

With reference to FIGS. 8-9, a further embodiment of the present invention will be explained. FIG. 8 is a simplified block diagram of an input stage of a conventional driver 20, showing that such driver includes a power factor corrector 80. Such power factor corrector is known per se: a suitable embodiment is the well-known component L6561 available from STMicroelectronics; detailed information can for instance be found on the website for STMicroelectronics; this information is incorporated here by reference. Since such power factor corrector is known per se, a detailed explanation will be omitted here; it suffices here to note that the power factor corrector 80 has a multiplier input 81 which is supposed to receive a voltage signal proportional to the rectified mains, which signal is normally provided by a resistive divider consisting of a series arrangement of two resistors 82, 83 connected between the input terminals 21 of the driver 20, the node between these resistors being connected to multiplier input 81. Further, a capacitor 84 is typically connected in parallel to one of the resistors, in order to make the power factor corrector 80 less sensitive to noise. The power factor corrector 80 has a push-pull output 85 for driving a power MOSFET (not shown) providing the LED current. Basically, the function of the power factor corrector 80 is to generate a drive signal such that the power to the LEDs depends on the duration of the phase-cut input voltage.

In drivers where such power factor corrector 80 is applied, the present invention proposes a relatively simple and cost-efficient solution for temporarily increasing the TRIAC current in response to a leading edge. Such driver, indicated at reference numeral 920 in FIG. 9, involves a series arrangement of a resistor R and a capacitor C connected in parallel to the other one of said resistors. Under normal circumstances, the capacitor C blocks slow voltage variations, so the multiplier input may be considered as not being affected. In the case of a leading edge, the capacitor allows this edge to be passed on to the multiplier input 81, so that the power factor corrector 80 in response temporarily generates a higher output current.

Summarizing, the present invention provides a current correction circuit 200 having an input 201 and comprising:

a first controllable current source 220 having an input connected to the circuit input for drawing a first current $I_{220}$ from said circuit input;

a differentiator or slope detector or edge detector 210 having an input coupled to the circuit input and having an output coupled to the first current source; and/or a second controllable current source 240 having an input connected to the circuit input for drawing a second current $I_{240}$ from said circuit input;

a voltage comparator 230 having a first input coupled to the circuit input 201, having a second input coupled to receive a reference signal Vref, and having an output coupled to the second current source.

The circuit is responsive to voltage changes by drawing first current pulses 221 from said circuit input, and/or to low voltages by drawing second current pulses 241 from said circuit input.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, instead of a lamp L the driver may drive another dimmable load.

Further, in the embodiment as illustrated in FIG. 4, the current drawn by the current sources 220 and/or 240 is considered to be waste. However, this is not essential for the gist of the present invention: it is also possible that this current is added to the output current of the driver 20 and thus provided to the load L. In any case, it is essential that this current is drawn from the supply line 14 so as to influence the behavior of a TRIAC in a dimmer attached to the supply line 14.

Further, consecutive trigger signals for the current sources typically have a distance in time corresponding to one half current period, or 10 ms for a 50 Hz mains. This fact can be used for preventing spurious triggering. Thus, it is possible to disable the edge detector or the voltage comparator after each trigger signal, for a disable time equal to or somewhat less than said half current period. For a trailing edge dimmer, it is possible that the edge detector or the voltage comparator is disabled after each trigger signal, and is enabled again on a zero-crossing and/or slope occurrence of the mains.

Figure 2:
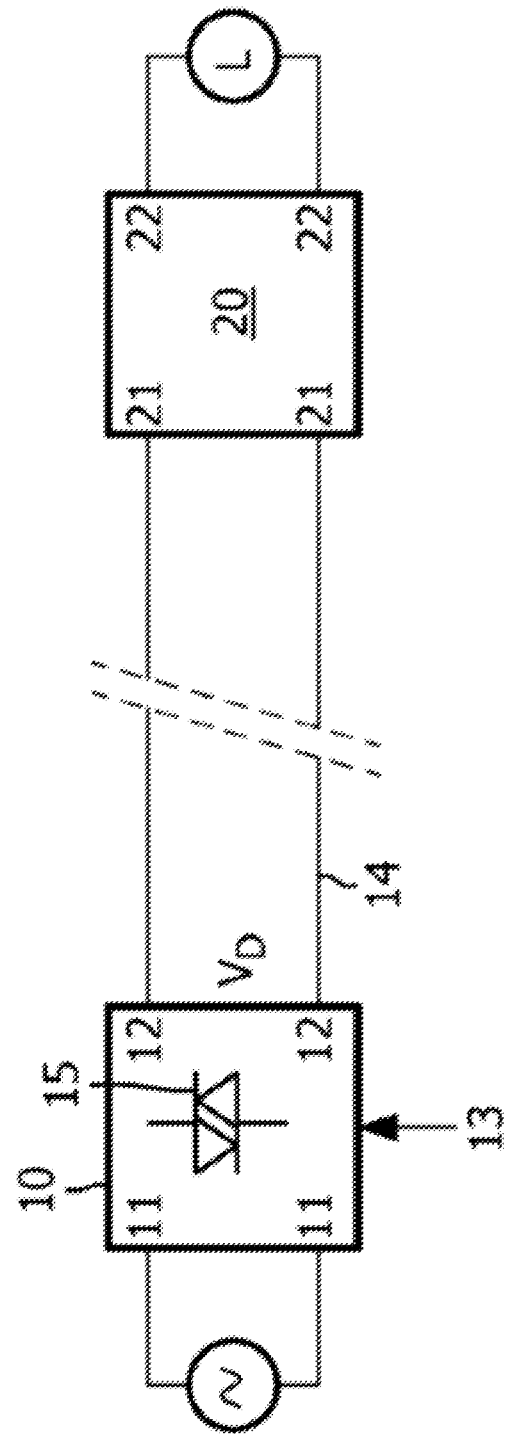
FIG. 2 is a block diagram of an electronic lamp driver connected to a mains dimmer.
Figure 7:
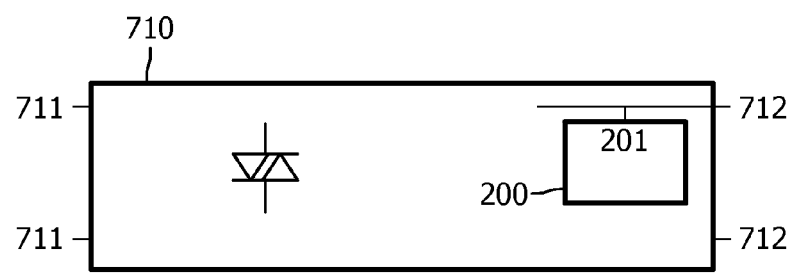
FIG. 7 is a block diagram schematically illustrating a dimmer according to the present invention.

Further, it is also within the gist of the present invention that the current correction circuit 200 is integrated in a dimmer. This is illustrated in FIG. 7, which schematically shows a dimmer 710 having an input 711 for connection to mains and having an output 712 for providing phase-cut dimmed mains $V_D$, which dimmer is provided with a current correction circuit 200 as described above, of which the circuit input 201 is connected to the dimmer output 712. Apart from this current correction circuit 200, the dimmer 710 may be identical to a conventional dimmer 10 as discussed with reference to FIG. 2.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A current correction circuit, having an input and comprising:
   a controllable current source having an input connected to the circuit input for drawing a current from said circuit input;
   a signal edge detector circuit having an input coupled to the circuit input and having an output coupled to the controllable current source for controlling the operation thereof; wherein the circuit is responsive to a voltage edge at the circuit input by drawing a current pulse from said circuit input.

2. The correction circuit according to claim 1, wherein the controllable current source is a triggerable current source designed to generate a current pulse on receiving a trigger signal, and wherein the output of the signal edge detector circuit is coupled to a trigger input of the controllable current source, said current pulse having a predetermined duration and shape.

3. The correction circuit according to claim 1, wherein the controllable current source is a switched current source designed to generate current when switched on by a control signal, and wherein the signal edge detector circuit is provided with a pulse generator designed to generate a control signal pulse having a duration determining the duration of the current pulse.

4. The correction circuit according to claim 1, wherein the signal edge detector circuit is a differentiator.

5. The correction circuit according to claim 1, wherein the controllable current source is responsive to the voltage at the circuit input by making the magnitude of the current pulse proportional to the momentaneous value of said voltage.

6. A correction circuit, having an input and comprising:
   a controllable current source having an input connected to the circuit input for drawing a current from said circuit input;
   a voltage comparator having a first input coupled to the circuit input, having a second input coupled to receive a reference signal (Vref), and having an output coupled to the controllable current source for controlling the operation thereof;
   wherein the circuit is responsive to a low voltage at the circuit input, lower than a level determined by said reference signal, by drawing a current pulse from said circuit input.

7. The correction circuit according to claim 6, wherein the controllable current source is a triggerable current source designed to generate a current pulse of a predetermined duration on receiving a trigger signal, and wherein the output of the comparator is coupled to a trigger input of the controllable current source.

8. The correction circuit according to claim 6, wherein the controllable current source is a switched current source designed to generate current when switched on by a control signal, and wherein the comparator is designed to generate a control signal pulse switching the controllable current source on for as long as the input voltage is lower than said reference signal.

9. The correction circuit according to claim 8, wherein the controllable current source is switched off when the input voltage reaches zero.

10. A current correction circuit, having an input and comprising:
    a first controllable current source having an input connected to the circuit input for drawing a first current from said circuit input;
    a signal edge detector circuit having an input coupled to the circuit input and having an output coupled to the first controllable current source for controlling the operation thereof; wherein the first controllable current source and signal edge detector circuit is responsive to voltage changes at the circuit input by drawing a first current pulse from said circuit input;
    a second controllable current source having an input connected to the circuit input for drawing a second current from said circuit input;
    a voltage comparator having a first input coupled to the circuit input, having a second input coupled to receive a reference signal, and having an output coupled to the second controllable current source for controlling the operation thereof; wherein the second controllable current source and voltage comparator is responsive to a low voltage at the circuit input, lower than a level determined by said reference signal, by drawing a second current pulse from said circuit input.

11. The correction circuit according to claim 10, further having one or more of the following features a-h:

a the first controllable current source is a triggerable current source designed to generate a current pulse of a predetermined duration on receiving a trigger signal, and the output of the signal edge detector circuit is coupled to a trigger input of the first controllable current source;

b the first controllable current source is a switched current source designed to generate current when switched on by a control signal, and the signal edge detector circuit is provided with a pulse generator designed to generate a control signal pulse having a duration determining the duration and/or shape of the current pulse;

c the signal edge detector circuit is a differentiator;

d the first controllable current source is responsive to the voltage at the circuit input by making the magnitude of the first current pulse proportional to the momentaneous value of said voltage;

e the second controllable current source is a triggerable current source designed to generate a current pulse of a predetermined duration on receiving a trigger signal, and the output of the comparator is coupled to a trigger input of the second controllable current source;

f the second controllable current source is a switched current source designed to generate current when switched on by a control signal, and the comparator is designed to generate a control signal pulse switching the second controllable current source on for as long as the input voltage is lower than said reference signal;

g the second controllable current source is switched off when the input voltage reaches zero h the first current source is disabled automatically after having generated its first current pulse, and wherein the first current source receives an enable signal either from the comparator or from the second current source.

12. A driver assembly for driving a dimmable load, the driver assembly having an input for connection to a supply line and an output for connection to the dimmable load, the driver assembly comprising:

a load driver having an input connected to the assembly input and having an output connected to the assembly output;

a current correction circuit according to claim 1, having its circuit input connected to the assembly input.

13. A driver assembly according to claim 12, wherein the output of the current correction circuit is connected to the assembly output.

14. A dimmer having an input for connection to mains and having an output for providing phase-cut dimmed mains, the dimmer further comprising a current correction circuit according to claim 1, having its circuit input connected to the dimmer output.

15. The correction circuit of claim 6, wherein the controllable current source is a triggerable current source designed to generate a current pulse on receiving a trigger signal, and wherein the output of the signal edge detector circuit is coupled to a trigger input of the controllable current source, said current pulse—having a predetermined duration and shape.

16. The correction circuit according to claim 6, wherein the controllable current source is a switched current source designed to generate current when switched on by a control signal, and wherein the signal edge detector circuit is provided with a pulse generator designed to generate a control signal pulse having a duration determining the duration of the current pulse.

17. The correction circuit according to claim 6, wherein the signal edge detector circuit is a differentiator.

18. The correction circuit according to claim 6, wherein the controllable current source is responsive to the voltage at the circuit input by making the magnitude of the current pulse proportional to the momentaneous value of said voltage.

* * * * *